United States Patent
Guillouard et al.

(10) Patent No.: US 8,514,795 B2
(45) Date of Patent: Aug. 20, 2013

(54) METHOD OF ADAPTIVE FREQUENCY ASSIGNMENT TO A PLURALITY OF ANTENNAS

(75) Inventors: Samuel Guillouard, Chantepie (FR); Vincent Demoulin, Monfort sur Meu (FR)

(73) Assignee: Thomson Licensing, Boulogne-Billancourt (FR)

( * ) Notice: Subject to any disclaimer, the term of this patent is extended or adjusted under 35 U.S.C. 154(b) by 69 days.

(21) Appl. No.: 12/735,167

(22) PCT Filed: Dec. 18, 2008

(86) PCT No.: PCT/EP2008/067812
§ 371 (c)(1),
(2), (4) Date: Sep. 23, 2011

(87) PCT Pub. No.: WO2009/080677
PCT Pub. Date: Jul. 2, 2009

(65) Prior Publication Data
US 2012/0051294 A1    Mar. 1, 2012

(30) Foreign Application Priority Data

Dec. 21, 2007   (EP) ..................................... 07301729

(51) Int. Cl.
*H04W 72/04*    (2009.01)
(52) U.S. Cl.
USPC ............ 370/329; 370/341; 370/322; 370/348
(58) Field of Classification Search
USPC ................................................ 370/389, 343
See application file for complete search history.

(56) References Cited

U.S. PATENT DOCUMENTS

| | | | |
|---|---|---|---|
| 2005/0135324 A1* | 6/2005 | Kim et al. ..................... | 370/343 |
| 2005/0207367 A1* | 9/2005 | Onggosanusi et al. ....... | 370/315 |
| 2006/0023745 A1 | 2/2006 | Koo et al. | |
| 2006/0072567 A1* | 4/2006 | Casaccia et al. .............. | 370/389 |
| 2006/0141949 A1 | 6/2006 | Varshney et al. | |
| 2006/0250935 A1* | 11/2006 | Hamamoto et al. .......... | 370/203 |
| 2007/0171811 A1 | 7/2007 | Lee et al. | |

FOREIGN PATENT DOCUMENTS

| | | |
|---|---|---|
| EP | 1531594 | 5/2005 |
| EP | 1608081 | 12/2005 |

* cited by examiner

*Primary Examiner* — Dang Ton
*Assistant Examiner* — Pamit Kaur
(74) *Attorney, Agent, or Firm* — Tutunjian & Bitetto, P.C.

(57) ABSTRACT

In order to improve the quality of transmission and reception of data packets, the method of transmission using several antennas comprises:
  an encoding of a first data packet into a first encoded block;
  a mapping of first transmission frequency channel to a first set comprising at least a transmission antenna;
  a mapping of second transmission frequency channel to a second set comprising at least a transmission antenna, the first transmission frequency channel being different of the second transmission frequency channel;
  a transmission of the first encoded block on the first set of at least a transmission antenna and on the second set of at least a transmission antenna.

The method of reception comprises a mapping of different frequency channel to reception antennas.

10 Claims, 7 Drawing Sheets

METHOD OF ADAPTIVE FREQUENCY ASSIGNMENT TO A PLURALITY OF ANTENNAS

This application claims the benefit, under 35 U.S.C. §365 of International Application PCT/EP2008/067812, filed Dec. 18, 2008, which was published in accordance with PCT Article 21(2) on Jul. 2, 2009 in English and which claims the benefit of European patent application No. 07301729.5 filed Dec. 21, 2007

1. FIELD OF THE INVENTION

The present invention relates to the field of wireless digital communication. More specifically, it deals with an efficient way to transmit a signal to be transmitted through a noisy channel or receive this signal in a system that is using several antennas for transmission and/or several antennas for reception (e.g. in a MIMO (or "Multiple Input Multiple Output") system).

2. TECHNOLOGICAL BACKGROUND

For wireless communication, we need to increase the data throughput as applications are handling more and more data. Channel bonding (i.e. using more than one channel frequency at a time) is a known technique to extend the data rate of a wireless solution. More recently, the used of the spatial dimension, with MIMO techniques, has emerged: the capacity improvement reaches the same order than the channel extension, i.e. doubling the number of antennas at TX and RX sides also doubles the bit rate. MIMO related techniques enable to significantly increase the throughput and/or reliability of wireless transmissions while keeping constant the transmitted power and allocated spectrum bandwidth. This feature makes these techniques particularly attractive for wireless systems in many configurations (e.g. for point-to-point communication, or point-to-multipoint communication or for broadcasting systems).

In addition, recent wireless solutions (such as WiFi) may integrate a DFS (Dynamic Frequency Selection) mechanism, meaning an ability to dynamically move from one channel to another, all antennas moving simultaneously from one frequency to another. Indeed, a drawback of this technique is that is not adapted to various types of situations.

3. INVENTION SUMMARY

The invention is aimed at alleviating these drawbacks of the prior art.

More particularly, an objective of the invention is to optimise a communication in a MIMO system, by enabling a good transmission or reception of data packets.

The invention relates to a method of transmission of one or several data packets by several transmission antennas adapted to transmit a signal. In order to improve the quality of transmission, it comprises:
an encoding of a first data packet into a first encoded block and a second data packet into a second encoded block;
a mapping of first transmission channel frequency to a first set comprising at least a transmission antenna;
a mapping of second transmission channel frequency to a second set comprising at least a transmission antenna, the first transmission channel frequency being different of the second transmission channel frequency;
a transmission of the first encoded block on the first set of at least a transmission antenna and on the second set of at least a transmission antenna;
lower than a threshold,
a mapping to second transmission frequency or third transmission frequency different of first frequency to the first set comprising at least a transmission antenna; and
a transmission of the second encoded block on the first set of at least a transmission antenna and on the second set of at least a transmission antenna.

Then, advantageously, the transmission of data packet(s) (e.g. a frame comprising a destination address) is transmission after encoding on several antennas, the frequency mapping on antenna being such that at least two different frequencies are used. Then, the quality of reception is not the same for all frequencies (due e.g. to noise, interferences, fading, Doppler effect, . . . ), the quality reception of transmitted packet(s) by a receiver is improved.

According to a variant, the method comprises:
a test of quality of reception of a signal at first transmission frequency; and
According to specific features, the method comprises:
a test of quality of reception of a signal at second transmission frequency; and
if quality of reception is greater than a threshold, it comprises:
a mapping to first transmission channel frequency or third transmission channel frequency different of second channel frequency to at least a part of the second set comprising at least a transmission antenna; and
a transmission of the second encoded block on the first set of at least a transmission antenna and on the second set of at least a transmission antenna.

According to a particular feature, the method comprises a mapping of antenna according to noise levels, each noise level being associated to each frequencies.

In specific embodiments, the noise levels are measured at the transmitter;

In advantageous embodiments, the method comprises:
a mapping of antenna according to at least a reception quality level at a given frequency; and
a reception of at least a reception quality level information, the reception quality level information being transmitted by a receiver.

In some variants of these embodiments, the reception quality level information is transmitted by a receiver used as destination of first encoded blocks.

Advantageously, the transmission of the first encoded block on the first set of at least a transmission antenna is made at a first power level and on the second set of at least a transmission antenna at a second power level, the first power level being lower than the second power level.

According to specific features, the encoding of first data packet into the first encoded block is a space time or space frequency block encoding.

The invention also relates to a method of reception of one or several data blocks by several reception antennas adapted to receive a signal. In order to improve the quality of reception and decoding of packets, the method comprises:
a mapping of first reception channel frequency to a first set comprising at least a reception antenna;
a mapping of second reception channel frequency to a second set comprising at least a reception antenna, the first reception channel frequency being different of the second reception channel frequency;

a reception of at least a first encoded block on the first set of at least a reception antenna and on the second set of at least a reception antenna;

a decoding of the at least one received first encoded block into at least one first data packet;

a test of quality of reception of the signal at a first reception channel frequency, so that a transmitter can map transmission channel frequency to transmission antennas.

According to specific features, the method of reception comprises the transmission of an information representative of at least a reception quality level at a determined frequency, the information being transmitted to the transmitter transmitting the first encoded block.

According to specific features, the method of reception comprises a check of a modification of transmission channel frequency mapping.

Advantageously, the method of reception comprises an adaptation of the channel frequency mapping on reception antennas on transmission frequencies used by a transmitter according to the check's result

4. BRIEF DESCRIPTION OF THE DRAWINGS

The invention will be better understood, and other features and advantages will become apparent from reading the description that follows, the description referring to the appended drawings in which.

Figure 2:
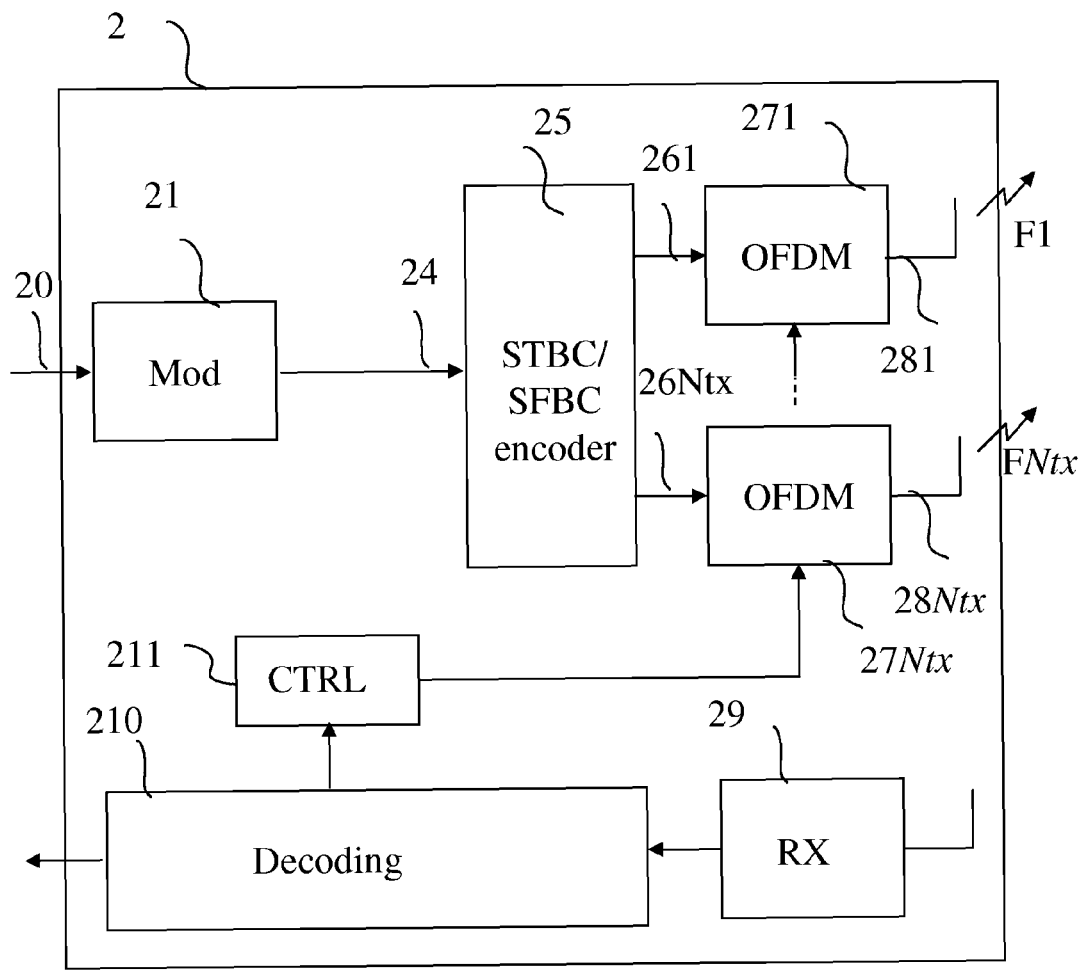
FIG. 2 represents an exemplary functional architecture of a data transmitter capable of sending data in a way compliant with the invention.
Figure 3:
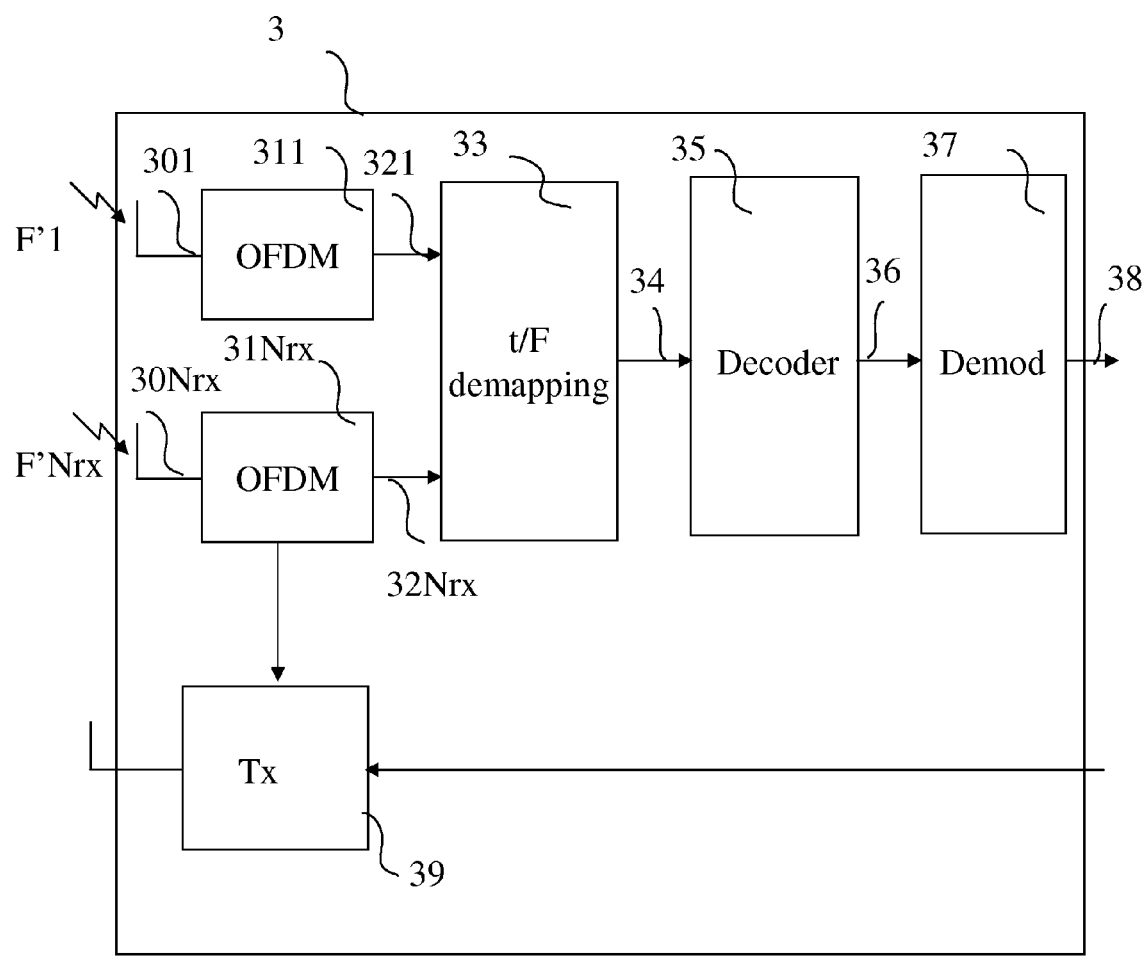
FIG. 3 represents an exemplary functional architecture of a data receiver according to a specific embodiment of the invention.
Figure 8:
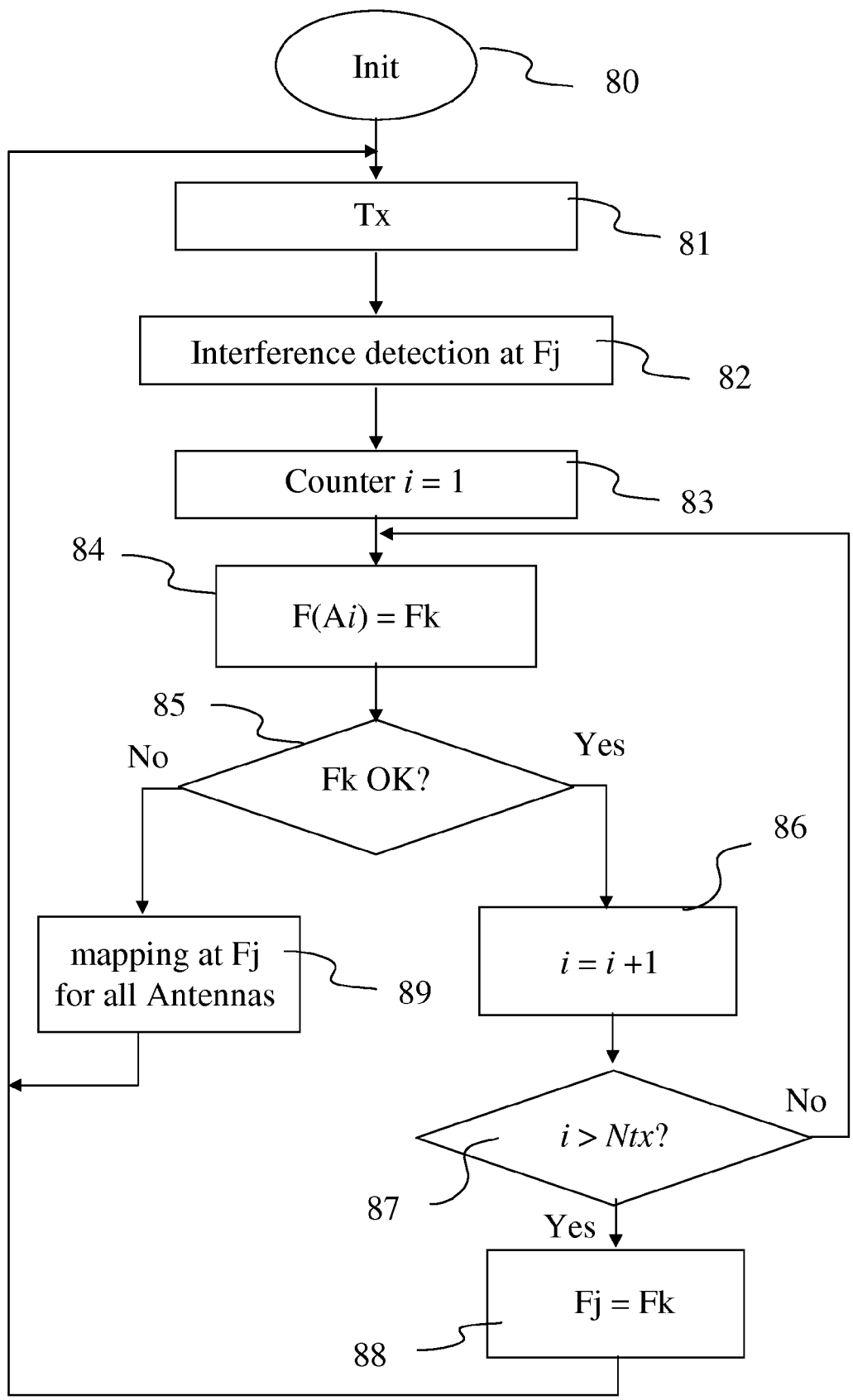
Figure 9:
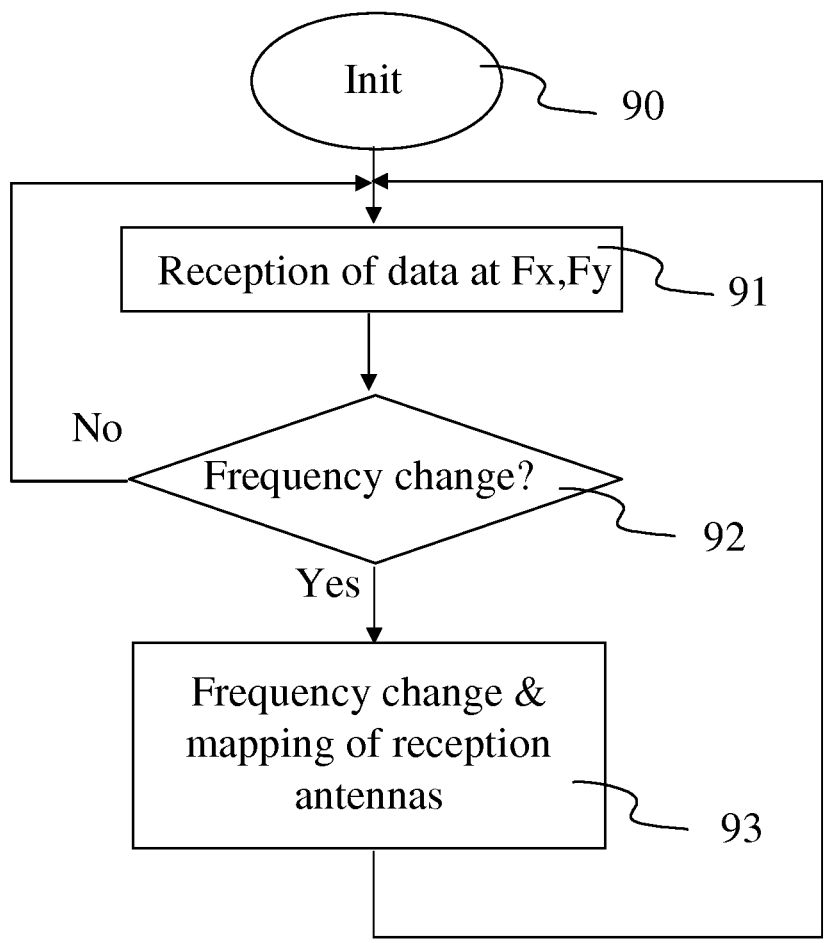

FIG. 8 discloses a transmission method implemented in a transmitter of FIG. 2; and FIG. 9 describes a reception method implemented in the receiver of FIG. 3.

5. DETAILED DESCRIPTION OF THE INVENTION

The invention enables a dynamic selection of transmission frequencies and specific use of the selected frequencies by transmission antennas and/or reception antennas in a system with several transmission and/or several reception antennas. According to the invention, the frequencies applied to some transmission antennas can change, while other transmission antennas remain assigned to another frequency (or other frequencies). Then, the assignment (or mapping) of frequencies to transmission antennas is dynamically managed and can be optimized according to the transmission channel. E.g. some noisy frequencies can be avoided or some frequencies can be tested before the frequencies of all transmitted signals are changed (whereas in a state of the art DFS, all transmission antennas change simultaneously to the same frequency, and then can not be adapted to different situations e.g. to an on the fly test of transmission frequencies or to a situation wherein a mix of different frequencies is suitable for better reception). According to the invention, the method enables also to come back on initial frequencies after a change so that it is easy to have an adaptation of the transmission/reception of data according to some parameters (e.g. interferences, noise, desired throughput, . . . ). According to the invention, the frequency mapping on antennas can be determined to take into account a mix of frequencies optimising the level of signal/noise ratio or lower the interference level. The invention relates also to a reception method based on the used of several reception antennas and adapted to receive a signal on different frequencies.

Frequency mapping on an antenna means here that an antenna is assigned to a frequency band that includes the frequencies used for the transmission of a modulated symbol (e.g. an OFDM symbol for a multi-carrier modulation or a PSK or QAM single carrier symbol). Two different frequencies mapped on two antennas means that the central frequencies of these frequency bands assigned to these transmission and/or reception antennas are different.

Figure 1:
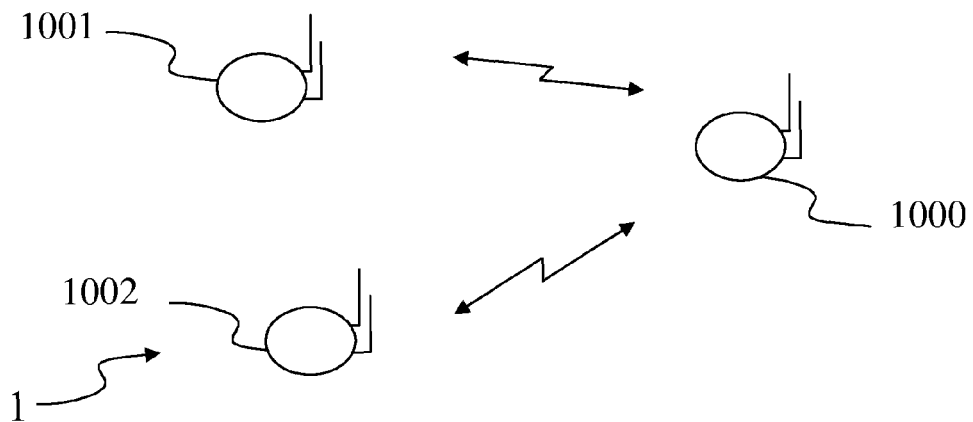
FIG. 1 represents a wireless network.

FIG. 1 represents a wireless network 1 comprising several stations 1000 to 1002. Each station 1000 to 1002 comprises a transmitter and a receiver using a MIMO (or Multiple Input Multiple Output) antenna system. Station 1000 communicates with stations 1001 and 1002 through a wireless link.

FIG. 2 represents an exemplary functional architecture of a data transmitter 2 capable of sending data in a way compliant with the invention applied to coding of a signal transmitted through a MIMO noisy channel. The data transmitter 2 can be implemented in stations 10 to 12.

The transmitter 2 comprises:
- a modulator 21;
- a STBC (Space Time Block Code)/SFBC (Space Frequency Block Code) encoder 25;
- Ntx OFDM modulators 271 to 27Ntx each modulating with an OFDM modulator an input signal 261 to 26Ntx;
- Ntx antennas 281 to 28Ntx, each being associated to an OFDM modulator respectively 271 to 27Ntx;
- a receiving module 29 adapted to receive a signal from a remote transmitter; and
- a decoding module 210 demodulating and decoding data received from the module 29 and transmitting them to an application or to a control module 211.

Here, antennas 281 to 28Ntx are considered as including RF (Radio Frequency) part (especially, frequency transposition, power amplification and filtering). Advantageously, it includes a linearized HPA (High Power Amplifier) that enables to avoid distortions of transmitted signal. Each antenna 281 to 28Ntx is adapted to transmit a signal at a frequency denoted Fi (i being equal respectively to 1 to Ntx). The decoding module transmits to the control module 211 the level of noise (e.g. interferences and/or signal/noise ratio) and/or reception quality level at different possible frequencies. In a first embodiment, a receiver receiving the signal transmitted by the transmitter 2 checks the level of reception quality at least one and advantageously at each possible frequency F1 to Fmax (e.g. on signal transmitting by transmitter 2 and, possibly, by other transmitters) and transmits this information to the transmitter 2 by any way (e.g. through a wireless or wired link). This information is forwarded to the decoding module 210, that decodes it and transmits it to the control module 211. Then, this module 211 determines and selects the set of frequencies, that can be used, and for each antenna, 281 to 28Ntx the corresponding frequency. Then, the module 211 controls the OFDM modulators 271 to 27Ntx so that each antenna 281 to 28Ntx is using a selected F1 to FNtx frequency associated to itself.

According to a variant of the invention, the receiving module 29 and decoding module 210 are replaced by a spectrum sensor that analyses the level of interferences at the frequencies that can be used and sends the corresponding results to the control module 211.

The transmitter 2 receives from an application a binary signal 22 which is digitally modulated by the modulator 21 with a first modulation which is, for instance a QAM modulation (or "Quadrature Amplitude Modulation") (e.g. 16 QAM or 64QAM). The modulator 21 generates groups of Q' complex QAM symbols S1 to SQ'. Q' is for example equal to 1024 and equals the product of the STBC/SFBC rate by the numbers of transmit antennas (Ntx) and by the number of subcarriers. In our example, the code rate is e.g. equal to 1, Ntx equals 2 and the number of subcarriers equals 512. Each group of Q' symbols is then encoded with the encoder 25 to form a STBC/SFBC codeword. The STBC/SFBC is, for instance, a Golden code such as disclosed in document "The Golden Code: A 2×2 Full-Rate Space-Time Code with Non-Vanishing Determinants," which has been written by J.-C. Belfiore, G. Rekaya, E. Viterbo (and published in IEEE Transactions on Information Theory, vol. 51, n. 4, pp. 1432-1436, April 2005.). According to a variant, the STBC is as disclosed in "Space-Time block codes from orthogonal designs" document written by V. Tarokh, H. Jafarkhani, and R. A. Calderbank (and published in IEEE Transactions on Information Theory, vol. 45, pp. 1456-1467, July 1999). The STBC/SFBC is based on a complex matrix of dimension $N_{rx}*N$ where N is the time dimension of the STBC/SFBC.

At the output of encoder 25, the generated signal has been mapped in a time/frequency mapper that transmits a dedicated signal 261 to 26Ntx to each of OFDM modulator 271 to 27Ntx. Then, each modulator 271 to 27Ntx modulates its input signal into an OFDM modulated signal; after possibly filtering, it also transposes the signal to the selected frequency and amplifies it (as usually done in a radio transmitted signal) and finally sent on an antenna respectively 281 to 28Ntx. As summary, the information data is then sent on a MIMO channel on each antenna 281 to 28Ntx at a selected frequency F1 to FNtx.

There are many possible variants of the transmitter that are compliant with the invention.

According to other variants (that are compliant with previous ones), the first modulation can be of any digital modulation, e.g. single carrier or multi-carrier nPSK (for "Phase Shift Keying with n phase values) or nQAM (eg with n equals to 16, 32, 64, 256 . . . ).

According to a variant of implementation, the encoder 25 is a spatial multiplexing (based e.g. on a VBLAST transmission scheme, VBLAST meaning Bell Labs Layered Space Time (as disclosed in document written by Gerard. J. Foschini (1996), entitled "Layered Space-Time Architecture for Wireless Communication in a Fading Environment When Using Multi-Element Antennas" and published in Bell Laboratories Technical Journal October on pages 41-59)).

FIG. 3 represents an exemplary functional architecture of a data receiver 3 according to a specific embodiment of the invention. The receiver 3 receives a signal sent by the transmitter 2 through a wireless channel. This channel is noisy and comprises Additive White Gaussian Noise (or AWGN) and possibly other noise such as interferences. The received signal can also be affected by multipath echos, signal fading and/or Doppler effect. The data receiver 3 can be implemented in stations 1000 to 1002.

The receiver 3 comprises:
Nrx antennas 301 to 30Nrx;
Nrx OFDM demodulators 311 to 31Nrx each demodulating a noisy OFDM modulated signal transmitted by an antenna respectively 301 to 30Nrx;
a time/frequency demapper 33;
a decoder 35;
a demodulator 37; and
a transmitting module 39.

The receiver 3 matches the transmitter 2 (especially for modulation and code used by the transmitter). Then, according to variants using single carrier modulation inside the transmitter, the OFDM demodulators are replaced by the corresponding single carrier demodulators. Each antenna 301 to 30Nrx is associated to a frequency respectively F'1 to F'Nrx, so that all the frequencies used by the transmitter 2 can be received by the receiver 3 at each time. The set of frequencies F1 to FNtx is included in the set of frequencies F'1 to F'Nrx. If the number, Nrx, of reception antennas is the same as the number, Ntx, of transmission antennas, then the frequencies Fi used in transmission can be equal to the frequency F'j used in reception. Indeed, it is not mandatory.

According to a variant of the invention, the number of frequencies used by the receiver 3 is lower than the number of frequencies used by the transmitter 2, the signal transmitted by the transmitter 2 comprising redundant information. The receiver 3 advantageously selects a subset of transmission frequencies (e.g. by scanning of frequencies among possible frequencies) and maps on reception antennas.

According to a variant of the invention, the number of frequencies used by the receiver 3 is greater than the number of frequencies used by the transmitter 2. The receiver 3 advantageously selects all transmission frequencies and maps them on reception antennas, some frequencies being mapped on several antennas. According to a specific embodiment, frequencies, where the level reception quality is the lowest or where the level of noise or interferences is the greatest, are advantageously mapped on several antennas, whereas other frequencies are mapped on one antenna. This enables to average the level of noise among reception frequencies. According to another embodiment, frequencies, where the level reception quality is the greatest or where the level of noise or interferences is the lowest, are advantageously mapped on several antennas, whereas other frequencies are mapped on one antenna. This enables to take benefit of STBC/SFBC encoding.

The transmitting module 39 received information on quality of reception or on noise or interference level on at least a used frequencies or possible frequencies F'i, this information coming e.g. from OFDM demodulators 311 to 31Nrx (demodulation or synchronisation part or front-end inside these demodulators) and/or from dedicated module (noise or interference measurement module not illustrated on FIG. 3). Then, the transmitting module 39 builds and sends a frame to inform the transmitter 2 accordingly: the transmitting module 39 can send a part or all these information to the transmitter 2 by any way (e.g. through a wireless or wired link) matching the receiving module 29. According to a variant, the transmitting module 39 sends a list of frequencies among the possible frequencies that can be used to the transmitter 2 with a parameter indicating if the frequency can be used or not, or which indicates more accurately a degree of reception quality (or interference level) associated to each possible frequency or part of them. For example, it can indicate that some frequencies are very noisy and advices (or requests) the transmitter 2 to not use them; it can also indicate that some other frequencies may not be used as the corresponding noise of interference level is high or reception quality is low; finally, it can advise or request the transmitter 2 to use some frequencies that are reliable.

According to a variant, the receiver 3 does not implement a transmitting module 39 dedicated to request or advise the transmitter 2 to use some specific frequencies (e.g. when the transmitter 2 is using a sensor to determine which frequencies can be used).

According to a variant of implementation, the decoder 35 is a spatial multiplexing decoder (e.g. compliant with a VBLAST transmission scheme).

On embodiment illustrated in FIG. 3, the receiver 3 comprises Nrx receive antennas 301 to 30Nrx so that the received signal 301 to 30Nrx can be represented by a Nrx*N matrix, or equivalently a (Nrx*N)*1 vector R. N is, for instance, equal to 2 and represents the time and/or frequency range occupied by the STBC.

The transmission between the encoder 23 and decoder 35 can be modeled by the following equation:

$$R = \underbrace{\begin{pmatrix} H_1 & 0 & \cdots & 0 \\ 0 & H_2 & \ddots & \vdots \\ \vdots & \ddots & \ddots & 0 \\ 0 & \cdots & 0 & H_N \end{pmatrix}}_{G} CS + v = GS + v \qquad \text{(equation 1)}$$

Where the different parameters are as follows:

R is the complex (Nrx*N)*1 received vector;

$H_i$ is the complex Nrx*Ntx channel matrix at time/frequency interval i (frequency corresponds to a carrier of the multicarrier modulation; according to a variant using a single carrier modulation the interval i corresponds to a time interval);

$H = diag(H_1, \ldots, H_N)$ is the complex block diagonal (N*Nrx)*(N*Ntx) channel matrix at time/frequency intervals 1 to N;

C is the complex (Ntx*N)*Q STBC/SFBC coding matrix (e.g. Q=4 or 8), where Q is the number of input complex symbols per STBC/SFBC codeword;

S is the complex Q*1 input vector of extended modulated symbols (after pre-encoding). CS in equation (1) denotes the STB encoded signal. The encoding process is represented by complex matrix multiplications;

v is the complex (N*Nrx)*1 Additive White Gaussian Noise (or AWGN) vector with autocorrelation matrix $R_v = \sigma^2 I_{NNrx}$, where $I_{NNrx}$ is the identity matrix of size (N*Nrx)*(N*Nrx) and $\sigma^2$ represents the variance of the AWGN.

According to a variant, the space/time coding process takes place with real inputs (instead of complex inputs). Then, the C matrix is a real matrix with a dimension (2Ntx*N)*(2Q).

When the additive noise and interferences corrupting the received signal is not white, a whitening filter is advantageously implemented before the decoder 35. $\sigma^2$ represents the variance of the resulting whitened noise.

The time/frequency demapper 33 receives demodulated signal from OFDM demodulators 311 to 31Nrx and is doing the reverse mapping (corresponding to dual operation of encoder 25). It provides a demapped signal 34 to decoder 35.

The decoder 35 can be any decoder adapted to decode a signal that is based on a coding such as implemented in the transmitter 2. According to a specific embodiment, the decoder 35 is a lattice decoder and is particularly well suited to perform ML decoding of the STBC/SFBC encoded signal. It is for example based upon the method disclosed in "A universal lattice code decoder for fading channel," written by E. Viterbo and J. Boutros (and published in IEEE Trans. Inform. Theory, vol. 45, pp. 1639-1642, July 1999) or in document "Lattice basis reduction: Improved practical algorithms and solving subset sum problems," written by C. P. Schnorr and M. Euchner (and published in Math. ProGraming, vol. 66, pp. 181-191, 1994). Those documents disclose ML recursive decoding algorithms that are based on a lattice and enable enumeration of points and selection of points after reception of a signal representative of data. The selection of points is done in a sphere the diameter of which depends on the signal/noise ratio. After computation of some metrics, a ML point is selected either by enumerating candidates points in a sphere (Boutros) or by successive projections on sublattices (Schnorr/Euchner). The decoding can also be implemented in improved decoders such as disclosed in the patent applications filed under references EP06301039.1, EP06301038.3 and EP06301041.7 entitled "Method of decoding of a multidimensional received signal and corresponding device", and EP06301223.1 entitled "Method of decoding of a multidimensional received signal" and filed in the name Thomson Licensing SA.

Advantageously, the decoder is adapted to take into account the specificities of the frequency mapping. E.g. if the signal transmitted to the OFDM modulators 271 to 27Ntx correspond to a signal with constellations that are different, then the decoder 35 is adapted to decode a received signal corresponding to the constellations received at different frequencies F1 to FNrx. Advantageously, the decoder receives an information representative of the frequency mapping on antennas on transmission and reception sides; then, it assigns to zero the components of the matrix $H_i$ that correspond to a pair (transmission antenna, reception antenna) with different frequency mapping; this enables a simplification of the MIMO decoder and improves the quality of decoding (as these null values are not noisy).

The decoder 35 sends a decoded signal 36 to the demodulator 37. The demodulator 37 demodulates the decoded signal 36 and provides to an application a demodulated signal (e.g. bits).

There are many possible variants of the receiver that are compliant with the invention.

According to other variants (that are compliant with previous ones), the first modulation can be of any digital modulation, e.g. nPSK (for "Phase Shift Keying with n phase values) or nQAM (eg with n equals to 16, 32, 64, 256 . . . ).

Figure 4:
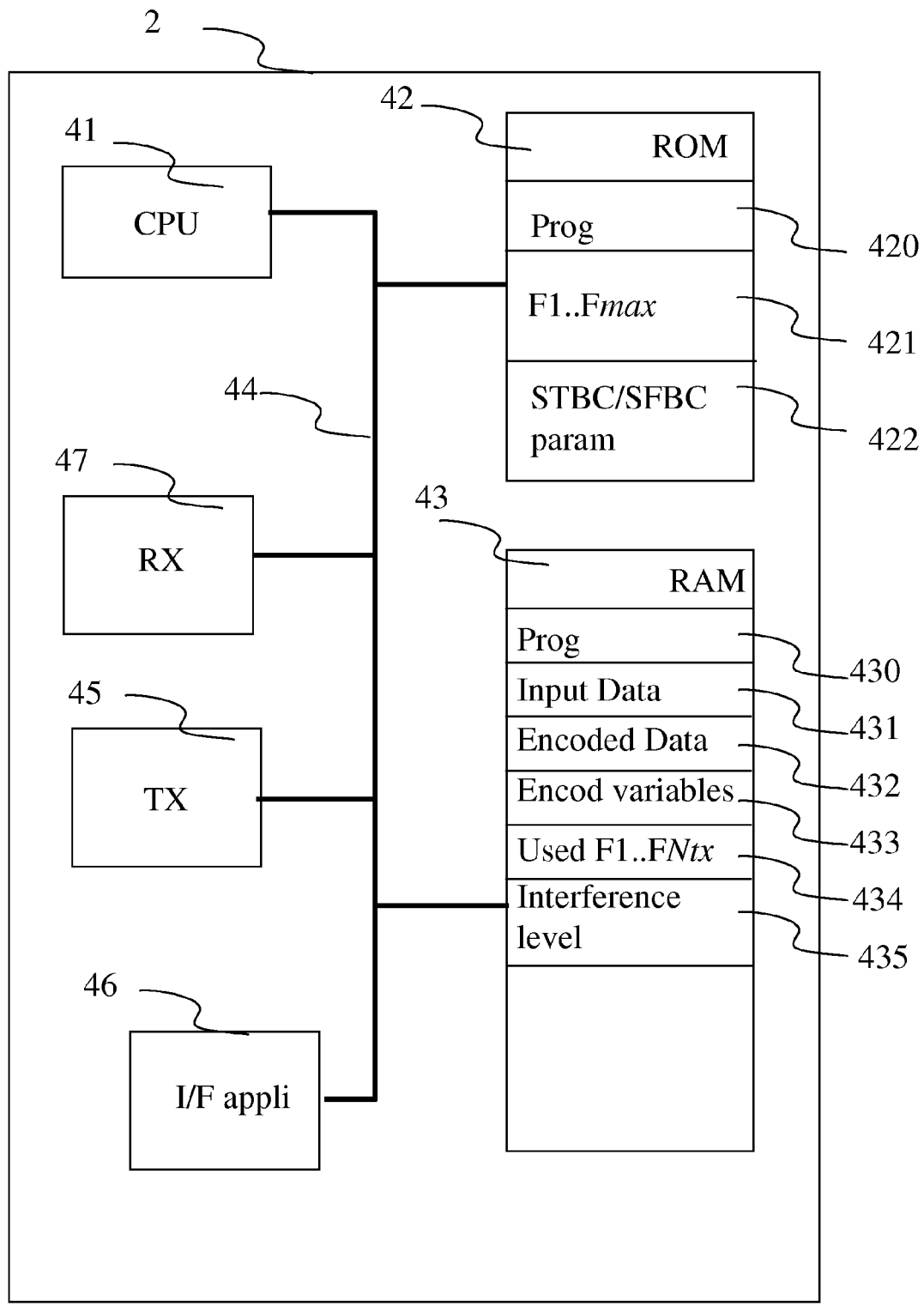
FIGS. 4 and 5 represent an exemplary hardware architecture of respectively the transmitter of FIG. 2 and the receiver of FIG. 3.

FIG. 4 represents an exemplary architecture of a transmitter 2.

Transmitter 2 comprises following elements that are linked together by a data and address bus 44:

- a microprocessor 41 (or CPU), which is, for example, a DSP (or Digital Signal Processor);
- a ROM (or Read Only Memory) 42;
- a RAM (or Random Access Memory) 43;
- an interface 46 for reception of data to transmit, from an application;
- a transmission module 45 (including RF part and antennas) for transmission of output signal on a wireless channel; and
- a reception module 47 (including RF part and antennas) for reception of a signal (e.g. indication of a interference level or quality of reception of signal transmitted by transmission module 45).

In each of mentioned memory, the word <<register>> used in the specification can correspond to area of small capacity (some bits) or to very large area (e.g. a whole program or large amount of received or decoded data).

ROM 42 comprises:

- a program 420;
- a set of frequencies F1 to Fmax that can be used in a register 421; and STBC/SFBC parameters 422 (such as used STBC/SFBC code, number of antennas).

Algorithms of the transmission method according to the invention are stored in the ROM 42. When switched on, the CPU 41 uploads the program 420 in the RAM and executes the corresponding instructions.

RAM 43 comprises:
- in a register 430, the program executed by the CPU 41 and uploaded after switch on of the transmitter 2;
- input data in a register 431;
- encoded data in different state of the encoding method in a register 432;
- other variables used for encoding in a register 433;
- frequencies F1 to FNTx actually used and their mapping to transmission antennas in a register 434; and
- the level of interferences for each possible frequencies F1 to Fmax in a register 435.

According to variant of the invention, the information register 435 contains other information such that a degree of confidence for each frequency (e.g. frequency "that can be used", "that can not be used", "that is very good"), or a level of interferences for each frequency F1 to Fmax.

According to a variant of the invention, the digital part of the transmitter 2 is implemented in pure hardware configuration (e.g. in one or several FPGA, ASIC or VLSI with corresponding memory) or in a configuration using both VLSI and DSP.

Figure 5:
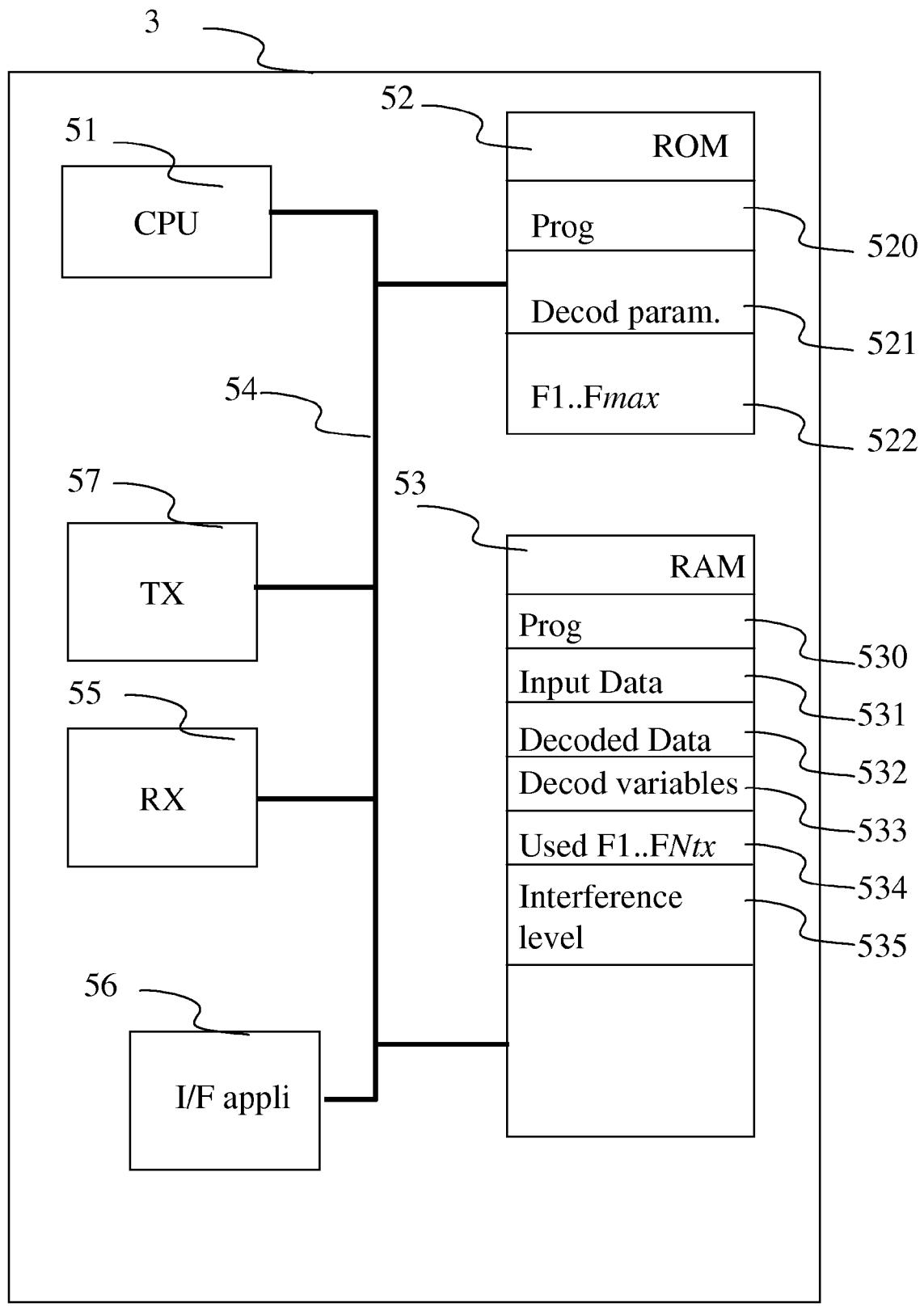

FIG. 5 represents an exemplary architecture of the receiver 3.

Receiver 3 comprises following elements that are linked together by a data and address bus 54:
- a microprocessor 51 (or CPU), which is, for example, a DSP (or Digital Signal Processor);
- a ROM (or Read Only Memory) 52;
- a RAM (or Random Access Memory) 53;
- a reception module 55 for reception of input signal and including antennas and RF part;
- an interface 56 for transmission of decoded data to an application; and
- a transmission module 57 (including RF part and antennas) for transmission of a signal to reception module 47 (the module 57 matches the module 47).

ROM 52 comprises:
- a program 520;
- decoding parameters 521 (such as used STBC/SFBC code, information representative of first and second constellations used in transmitter 2, number of reception antennas); and
- a set of frequencies F1 to Fmax that can be used in a register 522.

Algorithm of the reception method according to the invention are stored in the ROM 52. When switched on, the CPU 51 uploads the program 520 in the RAM and executes the corresponding instructions.

RAM 43 comprises:
- in a register 530, the program executed by the CPU 51 and uploaded after switch on of the receiver 3;
- input data in a register 531;
- decoded data in a register 532;
- other variables used for decoding in a register 533; and
- frequencies F1 to FNTx actually used for transmission, frequencies F1 to FNRx and their mapping to transmission antennas in a register 534; and
- the level of interferences for each possible frequencies F1 to Fmax in a register 535.

According to variant of the invention, the information register 535 contains other information such that a degree of confidence for each frequency or a level of interferences for each frequency F1 to Fmax.

According to a variant of the invention, the digital part of the receiver 3 is implemented in pure hardware configuration (e.g. in one or several FPGA, ASIC or VLSI with corresponding memory) or in a configuration using both VLSI and DSP.

Figure 6:
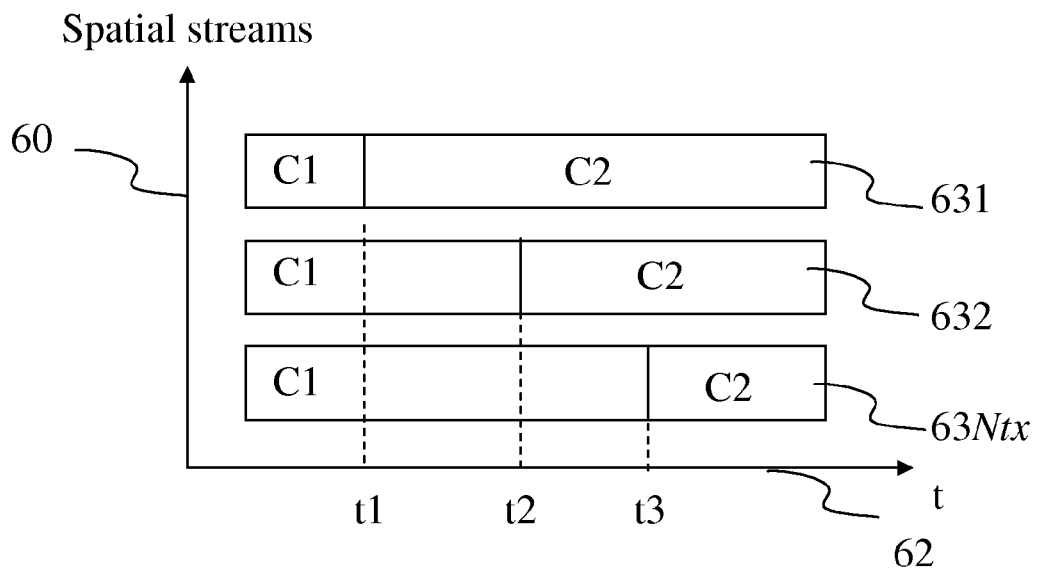
FIGS. 6 and 7 illustrate schematically two scenarios of communications between the transmitter of FIG. 2 and receiver of FIG. 3.

FIG. 6 illustrates a first exemplary scenario of change of frequency mapping on antennas.

The horizontal axis represents the time and different antennas (e.g. a first transmission antenna 631, a second antenna 632 and a $Ntx^{th}$ antenna 63Ntx as represented). Before time t1, all antennas are using a channel C1 associated to a frequency F1. At time t1, the mapping of antenna 631 is changed and antenna 631 is shifted to channel C2 associated to frequency F2. If the quality of reception is good or better than the quality of reception before t1 (for instance, if the receiver gives this information), then at time t2, the mapping of antenna 632 is changed and antenna 632 is also shifted on channel C2 associated to frequency F2. If the quality of reception is good or better than the quality of reception before t2, then at time t3, the mapping of antenna 633 is changed and antenna 633 is also shifted on channel C2 associated to frequency F2.

Figure 7:
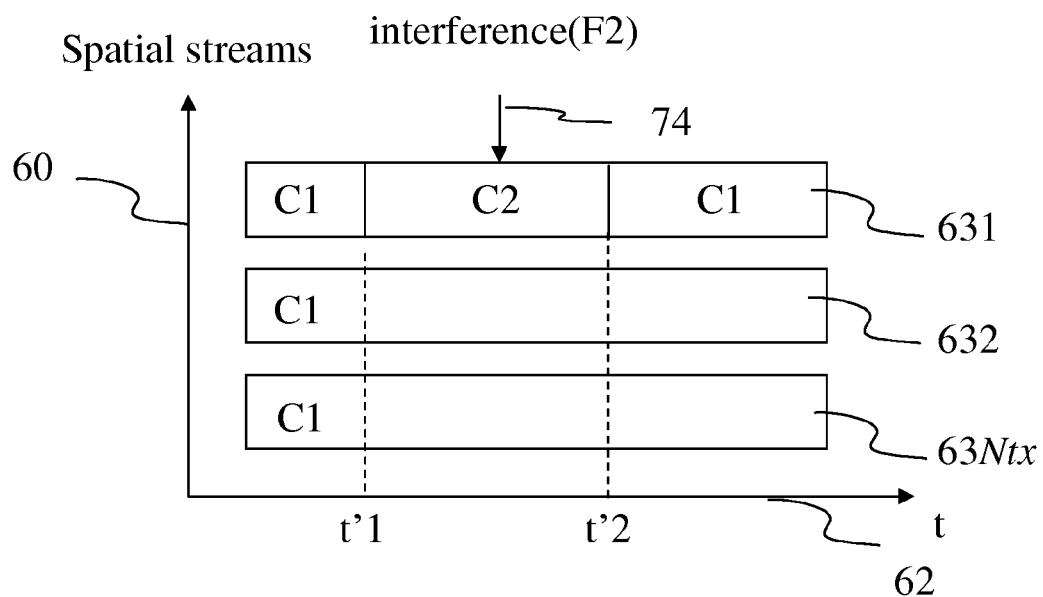

According to this scenario, the change of frequency mapping on transmission antenna entails good or better reception. FIG. 7 illustrates another scenario that can take place according to the invention. On FIG. 7, before time t'1, all antennas are using a channel C1 associated to a frequency F1. At time t1, the mapping of antenna 631 is changed and antenna 631 is shifted on channel C2 associated to frequency F2. If the quality of reception is bad or worst than the quality of reception before t'1 (for instance, if the receiver gives this information) (due e.g. to the presence of an interference present at time 74), then at time t'2, the mapping of antenna 631 is changed back to F1. Between times t'1 and t'2, the transmission is interfered on a single frequency F2 and then, on a single antenna 631. Consequently, the communication is not completely interrupted and can remain at a good level of robustness (whereas in a state of the art DFS system moving all antennas from frequency F1 to F2, the communication would have disappeared).

Of course, other scenarios than the ones disclosed in FIGS. 6 and 7 can be envisaged as explained hereafter (eg. scenarios with greater number of frequencies mapped, different ways to manage a noisy frequency . . . ).

FIG. 8 represents a specific embodiment of a transmission method according to the invention, the method being implemented in the transmitter 2.

The transmission begins with an initialization step 80, wherein different parameters of the method are set to their initial value(s). In this step, an initial frequency Fj is selected among possible transmission frequencies and the frequency Fj is mapped on all transmission antennas 281 to 28Ntx.

Then, at step 81, data are transmitted on antenna according to the frequency mapping.

Then, in step 82, the transmitter waits and gets an event assumed to entail a change of frequency. This event is e.g. an interference detected at frequency Fj, an information related to bad reception quality of signal (due for example to interference, noise at frequency Fj or fading of frequency Fj) at frequency Fj at any receiver or at a receiver used as destination of an encoded blocks, a request from a receiver or from a management unit.

After occurrence of the event of step 82, at step 83, a counter i is initialised to 1.

Then, at step 84, a frequency Fk different from frequency Fj is mapped on i$^{th}$ antenna 28i and a part of an encoded block (an encoded block resulting from encoding of a data packet and corresponding to an encoded symbol or several encoded symbols) are transmitted on antennas 281 to 28Ntx, some part of encoded block being transmitted on antennas 281 to 28i and other part of encoded block being transmitted on other antennas 28(i+1) to 28Ntx.

Then, during a test 85, the quality of reception at frequency Fk is tested. According to different variants, this test is using information forwarded by a receiver, a sensing probe and/or any other means that enables to give the level of quality of reception at frequency Fk.

If the result of test 85 is negative, then during a step 89, the initial frequency Fj is mapped on all antennas and step 81 is reiterated. The result of test 85 is negative, when e.g. the quality of reception (e.g. the reception power level and/or the error rate and/or the signal to noise ratio at transmitter or receiver) is below a given threshold or lower than a threshold corresponding to the quality of reception at another frequency (e.g. at Fj).

Else, i.e. if the result of test 85 is positive, the quality of reception being sufficient (or higher than a threshold), in a step 86, the counter i is incremented by one.

Then, a test 87 is carried out to check if the last antenna 28Ntx has been reached, the counter i being compared to Ntx.

If the counter i is lower or equal to Ntx, then the step 84 is reiterated.

Else, i.e. if the counter is greater than Ntx, during a step 88, the frequency Fj used by all antennas is assigned to Fk.

As summary, in the embodiment of method disclosed in steps 81 to 88, a first frequency Fj is mapped on all transmission antennas, and at occurrence of an event related to bad quality of reception at frequency Fj and/or on request from a receiver or management unit (e.g. for test purpose), the mapping of frequencies on antennas is smoothly changed; then, one or several encoded blocks are transmitted with this mapping, enabling a test of quality of reception with this mapping. If the quality of reception (or corresponding estimation) is sufficient for a new mapping, then the change of mapping can go on up a complete change. Else, the initial mapping is applied.

A smooth change of mapping is particularly suitable for a cognitive radio system, wherein the transmitter listens to the channel and transmits a signal on a free channel. According to a variant of invention, several frequencies (e.g. 2, 3, . . . Ntx different frequencies) can be mapped on the antennas. In this variant, at each iteration of step 84, a new frequency Fk among possible frequencies is mapped on i$^{th}$ antenna Ai (i.e. a frequency Fk that is different from frequencies mapped on previous antennas A1 to A(i−1)).

According to a variant of invention, if the result of test 85 is negative, instead of step 89 and reiteration of step 81, a new frequency Fk is selected, this new frequency being different from the frequency that has been mapped on antenna Ai at last iteration of step 84. Then, step 84 is reiterated with the new frequency Fk.

Then, as summary, the method of transmission of input data packets (e.g. a Packet Data Unit or PDU (as defined e.g. in standards such as IEEE802.11 or IEEE 802.16) comprising a destination address that is a unicast address or a multicast address or a broadcast address) by several transmission antennas adapted to transmit a signal comprises:

an encoding of a first data packet (e.g. a PDU) into a first encoded block (the encoded block being for example a space time or space frequency block);

a mapping of first transmission frequency to a first set comprising at least a transmission antenna;

a mapping of second transmission frequency to a second set of comprising at least a transmission antenna, the first transmission frequency being different of the second transmission frequency; and a transmission of the first encoded block on the first set of at least a transmission antenna and on the second set of at least a transmission antenna, a part of first encoded block being transmitted on the first set and another part of first encoded block being transmitted on the second set.

The number of antennas in the first set and second set can take any value and is only limited to the total number of transmission antennas. The mapping of frequencies to transmission antennas is not limited to the mapping of two different frequencies and can advantageously extended to the mapping a determined number of different frequencies greater than two, a mapping of each frequency being applied to a specific set of transmission antennas.

According to a variant of invention, at step 84, a transmission power level is associated to the mapping of a frequency on an antenna. This power level is advantageously lower when it is applied to a first set of one or several antennas during to transmission of an encoded block than the power applied to a second set comprising other antennas. Then, the quality of reception related to frequency used by the first set can be tested after mapping on one or several antennas, while the effect of the transmission of encoded block by the first set on the reception of signal transmitted by the second set remains low or limited. If the quality of reception of signal transmitted by the first set is good and/or better than a threshold (static threshold or dynamic threshold (e.g. depending on the quality of reception at other frequencies), then the transmission power applied to antenna(s) of the first set is increased. According to this variant, the total transmission power can remain constant (e.g. to be compliant to a regulation). Thus, when the transmission power is lowered on the first set of antennas, the transmission power applied to antennas of the second set of antennas is advantageously increased. These variants related to a specific management of transmission power level are also enabling a smooth change of mapping that is particularly suitable for cognitive radio systems, a radio system being then able to adjust their frequency mapping and power level according to other radio systems in a same location.

Advantageously, according to a variant of the invention, the transmitter 2 sends an information representative of the frequency mapping to receivers by any way (using eg. a dedicated radio signal on a specific channel or using a frequency already used by receivers (e.g. frequency previously mapped). Then, receivers can adapt their own reception frequency mapping, without frequency sensing or it enables a quicker adaptation of receivers.

FIG. 9 represents a specific embodiment of the reception method according to the invention, the method being implement the receiver 3.

The reception begins with an initialization step 90, wherein different parameters of the method are set to their initial value(s). Typically, default reception frequencies mapping is applied to reception antennas.

Then, during a step 91, the receiver 3 waits for and receives a signal transmitted by transmitter 2 over a wireless channel.

Then, at step 92, the receiver 3 checks if a transmission frequency mapping has changed. This check uses information coming e.g. from a sensing probe that probes which reception frequencies are used or from the transmitter 2 himself (through, for example, a dedicated channel or a frequency that is tuned by the receiver 3).

If no change in transmission frequency mapping occurs, then step 91 is reiterated.

Else, a transmission frequency mapping is detected and the receiver adapts the mapping of reception frequency on reception antenna on the actual transmission frequencies used. If the number of reception antennas is the same that the number of transmission antennas, advantageously, the mapping of frequency applied to reception antennas can be similar to the mapping of frequency applied to transmission antennas in the transmitter 2: e.g. is a first frequency is applied to three transmission antennas and a second frequency is applied to two transmission antennas, then advantageously the first frequency is mapped on three reception antennas and the second frequency is mapped on two reception antennas.

According to variants of invention, the mapping of reception antennas can be different from the mapping on transmission antennas (the number of transmission antennas being the same or different): the frequencies, where the reception quality level (e.g. signal/noise ratio or signal/interferences ratio is the greatest), are advantageously mapped on more antennas than the number of antennas used for these frequencies according to the mapping used by the transmitter 2. According to another embodiment, frequencies, where the reception quality level is the lowest, are advantageously mapped on less antennas than the number of antennas used for these frequencies according to the mapping used by the transmitter 2.

According to a variant of invention, the receiver measures quality of reception according to used frequency and transmits an information representative of at least a reception quality level at a determined frequency and advantageously at each used frequencies, the information being transmitted to the transmitter transmitting the first encoded block.

Then, as summary, the method of reception of data blocks (e.g. an encoded block being for example a space time or space frequency block applied to one or several data packets (or data frame comprising a destination address that is a unicast address or a multicast address or a broadcast address, e.g. PDU)) by several reception antennas adapted to receive a signal comprises:
- a mapping of first reception frequency to a first set comprising at least a reception antenna;
- a mapping of second reception frequency to a second set comprising at least a reception antenna, the first reception frequency being different of the second reception frequency;
- a reception of a first encoded block on the first set of at least a transmission antenna and on the second set of at least a transmission antenna, a part of first encoded block being received on the first set and another part of first encoded block being received on the second set;
- a decoding of the received first encoded block into a first data packet (the encoded block being for example a space time or space frequency block).

The number of antennas in the first set and second set can take any value and is only limited to the total number of reception antennas. The mapping of frequencies to reception antennas is not limited to the mapping of two different frequencies and can advantageously extended to the mapping a determined number of different frequencies greater than two, a mapping of each frequency being applied to a specific set of reception antennas.

The reception method can advantageously be applied to a smooth change of mapping following the change of mapping on transmission side.

Of course, the invention is not limited to the embodiments described above.

The invention is compatible with any type of wireless link (point to point links, wireless LANs, mobile networks, digital broadcasting, satellite communication, . . . ). The disclosed transmitter in FIG. 3 and receiver in FIG. 4 comprise then elements adapted to a specific application (such as front end, modulator or demodulator, MAC layer interface, and all other usual communication layer elements). The invention is especially well adapted to the transmission and reception of Digital Video Broadcasting (or DVB (e.g. DVB-T (terrestrial), DVB-H (handheld) . . . ). In this case, the discrete multidimensional coded signal comprises data representative of a digital video broadcast signal.

The invention is advantageously used in high spectral efficiency wireless transmission (MIMO system and/or nQAM modulation), and, in particular, high rate transmission. Indeed, the invention can be used for other transmission (eg. nQPSK modulation, . . . ).

According to MIMO decoding according to the invention, the receiver decodes a signal that has been space time encoded and transmitted with at least two antennas. The space time encoding can be based on a space time block code. According to a variant, the space time encoding is a simple spatial multiplexing; then, the code matrix C is the identity matrix.

The invention is advantageously applied to the transmission or reception of encoded blocks being space time or space frequency blocks, the information included in such a block being carried by different transmission frequencies. The invention can also be applied to the transmission or reception of other type of encoded blocks, such as a set of data belonging to the same data frame.

The invention claimed is:

1. Method of transmission of at least a data packet by several transmission antennas configured to transmit a signal, wherein it comprises:
   - an encoding of a first data packet into a first encoded block and a second data packet into a second encoded block;
   - a mapping of first frequency channel to a first set comprising at least a transmission antenna;
   - a mapping of second frequency channel to a second set comprising at least a transmission antenna, the first frequency channel being different from the second frequency channel;
   - a transmission of the first encoded block on the first set of at least a transmission antenna and on the second set of at least a transmission antenna;
   - if quality of reception at first frequency channel is lower than a threshold,
     - a mapping to second frequency channel or third frequency channel different from first frequency channel to the first set comprising at least a transmission antenna; and
     - a transmission of the second encoded block on the first set of at least a transmission antenna and on the second set of at least a transmission antenna.

2. Method according to claim 1, wherein, if quality of reception at first frequency channel is greater than a threshold, it comprises:
   - a mapping to first frequency channel or third frequency channel different from second frequency channel to at least a part of the second set comprising at least a transmission antenna; and
   - a transmission of the second encoded block on the first set of at least a transmission antenna and on the second set of at least a transmission antenna.

3. Method according to claim 1, wherein it comprises a mapping of antenna according to noise levels, each noise level being associated to each frequencies.

4. Method according to claim 2, wherein noise levels are measured at the transmitter.

5. Method according to claim 1, wherein it comprises:
   a mapping of antenna according to at least a reception quality level at a given frequency channel; and
   a reception of at least a reception quality level information, the reception quality level information being transmitted by a receiver.

6. Method according to claim 5, wherein the reception quality level information is transmitted by a receiver used as destination of first encoded blocks.

7. Method according to claim 1, wherein the transmission of the first encoded block on the first set of at least a transmission antenna is made at a first power level and on the second set of at least a transmission antenna at a second power level, the first power level being lower than the second power level.

8. Method according to claim 1, wherein the encoding of first data packet into the first encoded block is a space time or space frequency block encoding.

9. Method of reception of at least a data block by several reception antennas configured to receive a signal, the method being implemented in one receiver, wherein the method comprises:

mapping of first frequency channel to a first set comprising at least a reception antenna;

mapping of second frequency channel to a second set comprising at least a reception antenna, the first frequency channel being different from the second frequency channel;

receiving of at least a first encoded block on the first set of at least a reception antenna and on the second set of at least a reception antenna;

decoding of the at least one received first encoded block into at least one first data packet;

testing of quality of reception of the signal at a first frequency channel;

checking for a modification of transmission frequency channel mapping; and adapting the frequency channel mapping on reception antennas on transmission frequencies used by the transmitter according to the checked result.

10. Method according to claim 9, wherein it comprises the transmission of an information representative of at least a reception quality level at a determined frequency channel, the information being transmitted to the transmitter transmitting the first encoded block.

* * * * *